June 20, 1967 G. J. IVANS 3,326,483

MAGNETIC TAPE CARTRIDGE FOR AUTOMATIC TAPE CARTRIDGE CHANGING MECHANISM

Filed June 17, 1965 2 Sheets-Sheet 1

INVENTOR.
GALEN J. IVANS
BY
Mason, Kolehmainen, Rathburn & Wyss
Attys

June 20, 1967 G. J. IVANS 3,326,483

MAGNETIC TAPE CARTRIDGE FOR AUTOMATIC TAPE CARTRIDGE CHANGING MECHANISM

Filed June 17, 1965 2 Sheets-Sheet 2

INVENTOR.

GALEN J. IVANS

BY

Mason, Kolehmainen, Rathburn & Wyss

Att'ys

United States Patent Office 3,326,483

Patented June 20, 1967

3,326,483

MAGNETIC TAPE CARTRIDGE FOR AUTOMATIC TAPE CARTRIDGE CHANGING MECHANISM

Galen J. Ivans, Bloomington, Ind., assignor to Sarkes Tarzian, Inc., Bloomington, Ind., a corporation of Indiana Filed June 17, 1965, Ser. No. 464,717
21 Claims. (Cl. 242—55.13)

The present invention relates to apparatus for recording on or reproducing from magnetic tape contained in individual tape cartridges and, more particularly, to a magnetic tape cartridge arrangement which may be used in apparatus for automatically changing from one tape cartridge to another.

While the magnetic tape cartridge arrangement of the present invention is of general application, it is particularly suitable for use in an automatic type cartridge changing mechanism of the type described and claimed in a copending application of Morton L. Weigel, Ser. No. 389,014, filed on Aug. 12, 1964, which is assigned to the same assignee as the present invention. Accordingly, the magnetic tape cartridge of the present invention will be described in connection with a general description of this automatic tape cartridge changing mechanism and reference may be had to said copending application for a complete and detailed description thereof.

In the art of magnetic tape recording and reproducing apparatus, the trend has been to provide reels of tape which are sufficiently large to permit recording or reproducing a relatively large number of selections over a period of from 30 minutes to over an hour. While such arrangements have the advantage of storing a large number of selections or other information in compact form, they necessarily suffer from the disadvantage that selection of a particular item for reproduction at a particular place on the tape is quite involved and time consuming. In an effort to alleviate this disadvantage many arrangements have been proposed for turning the reels at high speed until the approximate location of the desired selection is reached so as to cut down the time required to find a particular selection. However, these arrangements do not have the flexibility of the conventional disc record automatic changer wherein a group of records each containing an individual selection which lasts from 3 to 5 minutes, may be placed on the spindle of the record changer in any desired order and played successively in this order in a fully automatic manner. This flexibility in the selection of individual pieces, and also the relatively brief period required to change from one record to another has in large measure been responsible for the continued popularity of disc records and the failure of the magnetic tape recording and reproducing art to displace such records.

While certain arrangements heretofore proposed have attempted to provide an arrangement for automatically changing from one magnetic tape to another, these arrangements are not likely to displace the disc record changer for the simple reason that they do not offer the ease of selection, simplicity of operation and rapid change cycle characteristics of the conventional automatic disc record changer. One such prior art arrangement, for example, is shown in Godell et al. Patent No. 3,100,090 wherein a group of magnetic tape cartridges are played in succession by successively pulling out the tape from each single reel cartridge and winding it on a common takeup spool by means of a conventional capstan drive during the actual recording or playback operation. A similar prior art arrangement is described in an article entitled, Compatible Cartridges for Magnetic Tape, by Marvin Camras, which appeared in IRE Transactions on Audio for September–October 1960, pp. 178–184. In these arrangements, after the tape has been wound on the takeup spool, it is rewound back onto the spool in the cartridge before the mechanism changes to the next cartridge. An arrangement is provided for searching for a particular selection on one of the tapes by moving the tape at high speed in either direction during the playing cycle. While the arrangement described in the Godell et al. patent is alleged to embody all of the advantages of conventional disc record changer mechanisms, this arrangement requires a much longer time to change from one tape cartridge to another, due to the time required for the rewinding operation, and also does not provide for instantaneous selection of the individual pieces or rearrangement thereof in any desired order as can be done in the disc record changer.

It is, therefore, a primary object of the present invention to provide a new and improved magnetic tape cartridge which may be economically produced and assembled on a mass production basis.

It is another object of the present invention to provide a new and improved magnetic tape cartridge which is adapted to be used in an automatic cartridge changing mechanism and is provided with means for preventing the cartridge from being inserted improperly in a retaining magazine.

It is a further object of the present invention to provide a new and improved magnetic tape cartridge which is provided with novel means for holding the same securely in place in a retaining magazine.

It is still a further object of the present invention to provide a new and improved magnetic tape cartridge which is arranged so that tape contained therein may be played in either direction while providing means for preventing improper insertion of the cartridge into a retaining magazine.

It is another object of the present invention to provide a new and improved magnetic tape cartridge which may be assembled on a mass production basis and has improved means for guiding a tape contained in the cartridge.

It is still another object of the present invention to provide a new and improved magnetic tape reel having novel means for retaining the end of a piece of magnetic tape secured thereto.

A still further object of the present invention is to provide a new and improved magnetic tape reel having an improved arrangement for securing one end of a piece of tape to the reel while preventing the formation of a bump along the periphery of the reel as tape is wound thereon.

The invention, both as to its organization and method of operation, together with further objects and advantages thereof, will best be understood by reference to the following description, taken in conjunction with the accompanying drawings, in which.

Figure 1:
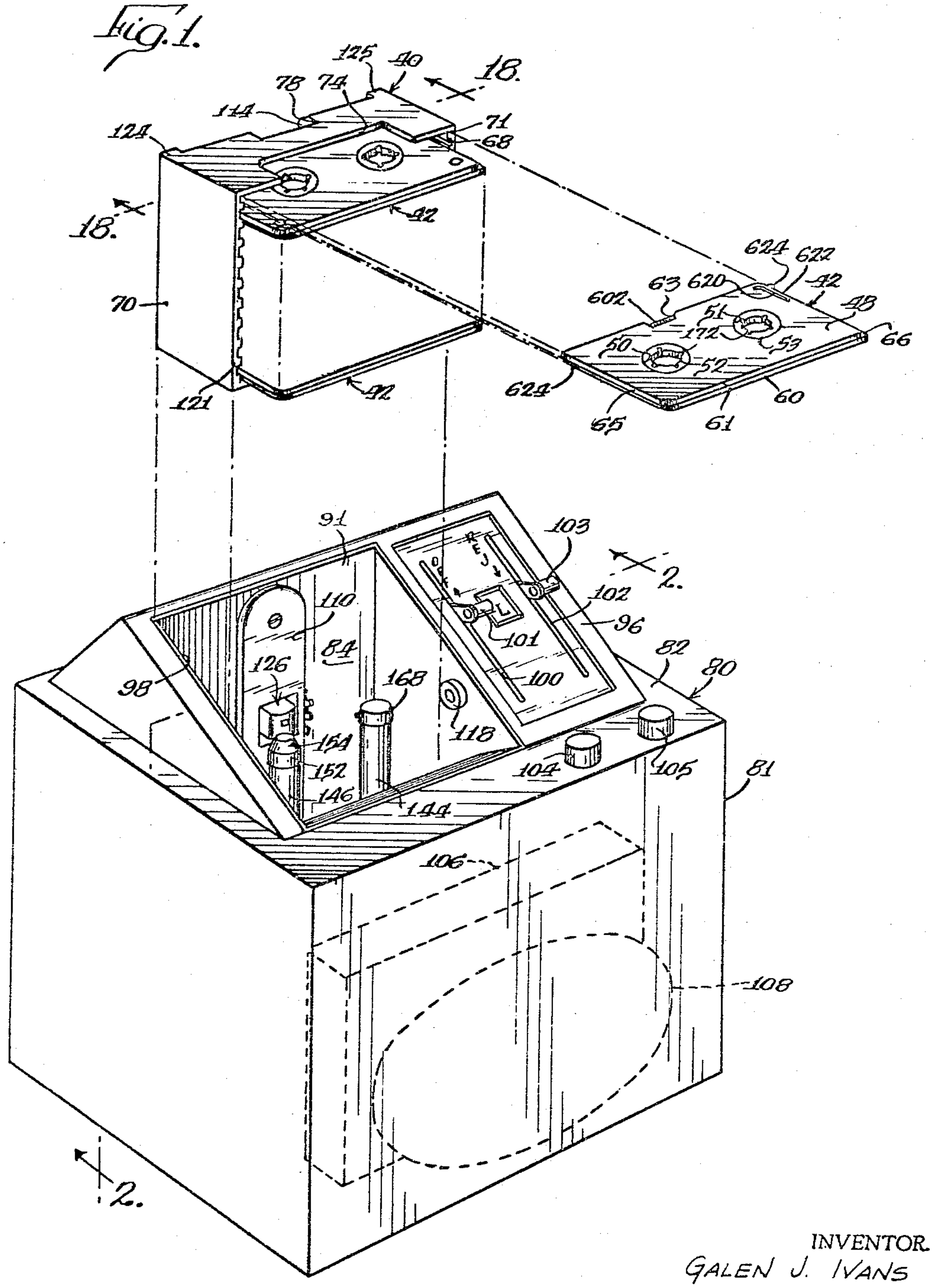
FIG. 1 is a perspective view of an automatic tape cartridge changing mechanism illustrating the manner in which a magazine of tape cartridges constructed in accordance with the present invention can be inserted into the mechanism.

Referring now to the drawings, the automatic tape cartridge changing mechanism is therein illustrated as including a removable magazine indicated generally at 40 within which a group of ten magnetic tape cartridges, constructed in accordance with the present invention and indicated generally at 42 may be selectively positioned in any desired order. Each of the cartridges 42 contains a pair of tape receiving flangeless reels 44 and 45 (FIG. 2) on which a length of magnetic tape 46 (FIG. 3) is wound. The top and bottom walls 48 and 49 of each cartridge 42 are provided with aligned apertures 50 and 51 therein which are adapted to receive enlarged hub portions 52 and 53 of the reels 44 and 45, respectively, so that these reels are loosely retained within the openings 50 and 51 of the cartridge 42. The hub portions 52 and 53 of the reels 44 and 45 are provided with central apertures 56 and 57, respectively, and when the cartridges are positioned within the magazine 40 the central apertures 56 and 57 of each cartridge are positioned in alignment with the corresponding central apertures of the other cartridges in the magazine.

Each of the cartridges 42 is comprised of two identical half sections 60 and 61 (FIG. 5) which are assembled together in a manner described in more detail hereinafter to provide the completed cartridge. Each of the sections 60 and 61 is provided with a notch 62, 63 in one side thereof which defines an opening through which the magnetic tape is accessible to a transducer head as it passes from one reel to the other within the cartridge. Also, the half sections 60 and 61 are so arranged that when assembled together they define sidewardly projecting offset shoulder portions 65 and 66 which are adapted to register with corresponding grooves 67 and 68 (FIG. 2) formed in the side walls 70 and 71 of the magazine 40. Accordingly, each of the cartridges 42 may be inserted in the magazine 40 in either one of two orientations but in both of these orientations the opening through which the magnetic tape within the cartridge is accessible is pointed to the rear of the magazine 40. Each of the magnetic tapes within the cartridges 42 is provided with two parallel sound channels, each of which may be monaural or stereo, on which individual selections are or may be recorded in opposite directions. Accordingly, either one of two selections may be selected by the user by choosing the proper orientation of a cartridge within the magazine 40.

In order to provide for automatic playing of the tapes within the cartridges 42 in rapid succession, the magazine 40 is provided with notch portions 74 in the top and bottom walls thereof which provide access to the central apertures of the reels of the aligned cartridges 42. Furthermore, the rear wall 76 of the magazine 40 is provided with a vertically extending opening or slot 78 which is generally in alignment with the notches 62, 63 of the cartridges 42 when they are assembled in the magazine so that the magnetic tapes in the respective cartridges are accessible from the rear of the magazine 40 through the slot 78.

Considering now the automatic tape changing mechanism proper, this mechanism, which is indicated generally at 80 in FIG. 1, comprises a generally box-like cabinet

81 and a cover 82. The changer mechanism 80 is provided with means defining a magazine receiving well 84 within which the magazine 40 is adapted to be inserted with either one of two orientations, as will be described in more detail hereinafter. The cover 82 of the changer 80, which may be either of metal or plastic, is formed to provide a sloping top wall portion 96 and this sloping wall portion 96 is provided with a rectangular opening 98 which is adapted to receive the upper edge portions of the well 84. The sloping top portion 96 of the cover 82 is also provided with a slot 100 through which an on-off lever 101 extends and a slot 102 through which a reject lever 103 extends. The cover 82 is also provided with suitable openings for receiving the on-off volume control knob 104 and tone control knob 105 of the playback amplifier indicated generally at 106 which is positioned within the cabinet 81 and is provided with a loudspeaker 108 of any suitable design which is also contained within the cabinet 81. It will be understood that by removing the handle portions of the levers 101 and 103 and the knobs 104 and 105 the cover 82 may be removed for service or repair of the mechanism of the changer 80.

In order to guide the magazine 40 so that it may be properly registered when inserted into the well 84, the rear wall 91 of the member 86 is provided with a vertically extending bevelled top guide shoulder indicated generally at 110 and the rear wall 76 of the magazine 40 is provided with a pair of vertically extending flanges 112 and 114 (FIG. 3) adjacent the edges of the slot 78 which are adapted to engage the sides of the shoulder 110 as the magazine 40 is inserted into the well 84. Also, two pairs of spring biased rollers, one of which is indicated at 118, are mounted in the side walls of the well 84 and bear upon the forward edges 120 and 121 of the magazine 40 as the magazine is inserted into the well. Accordingly, the magazine 40 is urged against the rear wall 91 by these pairs of rollers as the magazine 40 is inserted into the well. In addition to the vertically extending flanges 112 and 114, the magazine 40 is provided with vertically extending flanges 124 and 125 at the rear edges thereof which together with the flanges 112 and 114 function to space the cartridges 42 in the correct position for engagement of the magnetic tapes therein by a transducer head indicated generally at 126. Furthermore, the magazine is held in the correct position by these rollers when the lowermost cartridge is being played.

The magnetic tapes within the individual cartridges 42 are arranged to be played in rapid succession by means engageable with the central apertures of the reels within these cartridges and without removing the tape from the cartridge during the playing or tape changing operations. More particularly, within the well 84 there is provided a pair of vertically extending guide sleeves 144 and 146 which are spaced apart by an amount corresponding to the separation of the reels 44 and 45 within the cartridges 42. The guide sleeves 144 and 146 do not rotate and are of slightly smaller diameter than the central apertures 56 and 57 of the cartridge reels. However, the sleeve 146 is provided with a cap or head portion 152 which is of a diameter such that the central apertures 56, 57 of the cartridge reels will just slide smoothly thereover. The head portion 152 is provided with a conical top portion 154 which functions to center the loosely mounted cartridge reels as the magazine 40 is inserted into the well. The head portion 152 may be secured to the upper end of the guide sleeve 146 by any suitable means. The guide sleeve 144 is of somewhat smaller diameter than the central apertures 56, 57 of the cartridge reels. However, the sleeve 144 acts as a bearing support for a rotatable driveshaft which is positioned within the guide sleeve 144. In order to drive one reel of the selected cartridge while permitting movement of different cartridges into alignment with the transducer head 126, the driveshaft is provided with a head portion indicated generally at 168 which has a diameter such as to produce a sliding fit with the central apertures 56, 57 of the cartridge reels and is also provided with a protruding spring baised lug. The hub portions 52, 53 of the cartridge reels are each provided with a plurality of vertically extending grooves 172 (FIG. 3) which communicate with the central apertures 56, 57 and provide interlocking means adapted to be engaged by the drive lug in the head 168 when a particular cartridge is positioned with the head portion 168 in alignment with the reel hub of the cartridge. However, this drive lug may be compressed until the tip thereof is contained within the diameter of the head portion 168 so that the magazine 40 may be inserted over the head portion 168 and selectively moved to position different cartridges in alignment with the head portion 168 without jamming the drive mechanism. The head portion 168 is of a thickness substantially equal to the thickness of one of the cartridges 42 so that when a cartridge is positioned with one of the reel hubs thereof in alignment with the head portion 168 only this reel of the selected cartridge is driven by engagement of the drive lug with the edge of one of the grooves 172.

Figures 2, 3, 4, 5, 6, 7, 8:
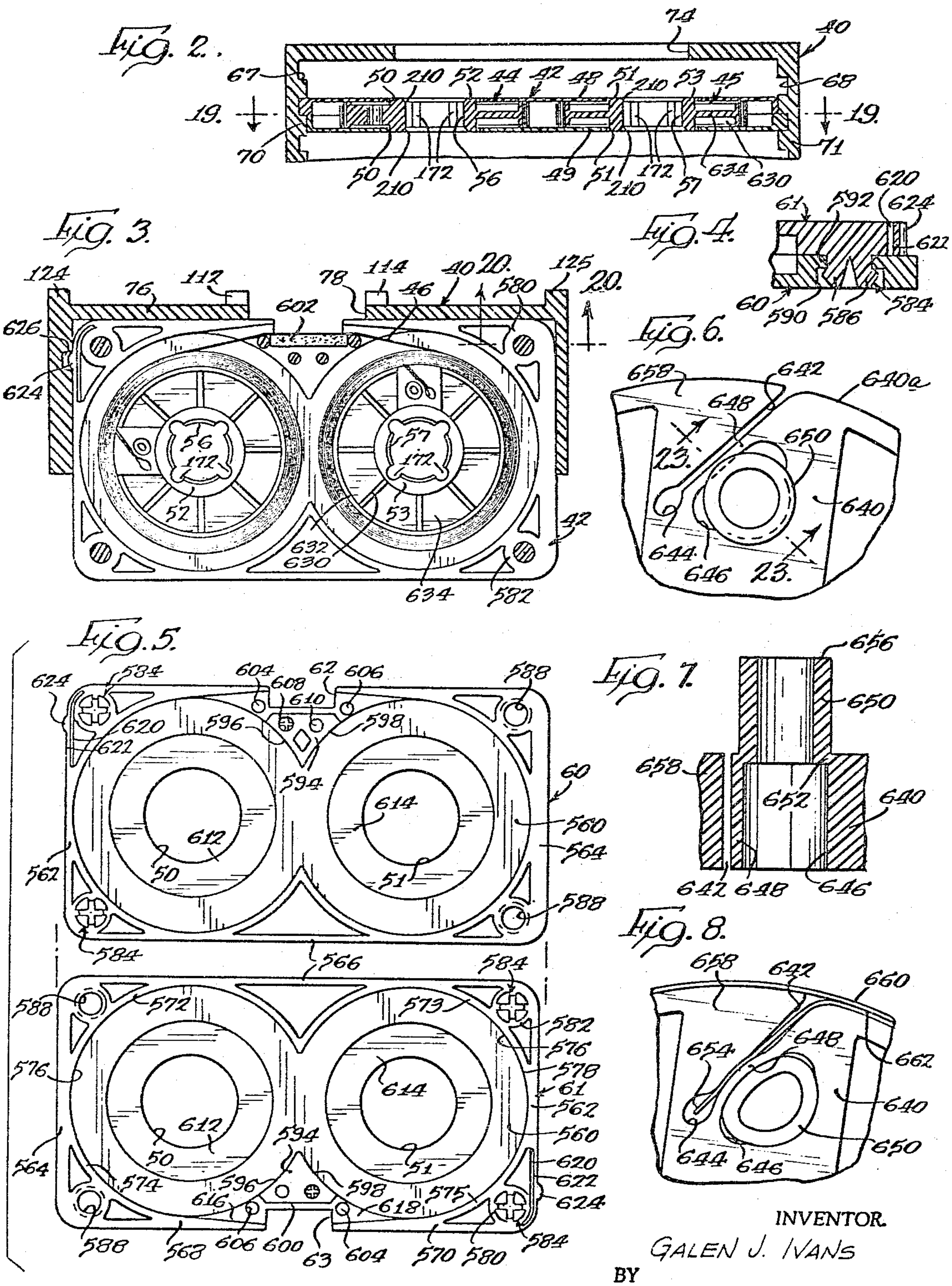
FIG. 2 is a sectional view of the magnetic tape cartridge of the present invention taken along the lines 18—18 of FIG. 1.
FIG. 3 is a sectional view taken along the lines 19—19 of FIG. 2.
FIG. 4 is a fragmentary sectional view on an enlarged scale taken along the lines 20—20 of FIG. 3.
FIG. 5 is a plan view of the two halves of the tape cartridge of the present invention shown in aligned position before they are assembled.
FIG. 6 is a fragmentary view of a portion of one of the reels of the tape cartridge of the present invention showing the manner in which the end of a length of tape is secured to the reel.
FIG. 7 is a sectional view taken along the lines 23—23 of FIG. 6.
FIG. 8 is a fragmentary plan view similar to FIG. 6 but showing the end of the tape secured to the reel.

Considering now in more detail the construction of the magnetic tape cartridges 42, and referring to FIGS. 2 to 5, inclusive, each of these cartridges is formed by a pair of identical half sections indicated generally at 60 and 61. Each of these sections includes a top or bottom wall portion 560. An upstanding narrow flange 562 forms one end rim of the sections 60, 61 and a wider flange 564 forms a rim at the other end of these sections. A further upstanding flange portion 566 forms a rim along the rear edge of the cartridge and a pair of flanges 568 and 570 form the front rim of the cartridge which is broken by the opening 63 therein. In addition to these rim flanges a plurality of arcuate flange portions 572, 573, 574, and 575 is provided adjacent each corner of the sections 60, 61 which cooperate with the side and end rims to provide circular flanged surfaces 576 and 578 which function to contain the tape wound on the reels 44, 45 when the sections 60 and 61 are assembled together. Each of the sections 60, 61 is provided with a pair of boss portions 580, 582 at the corners of one end thereof which provide a support for integrally formed locking pins 584, which are provided with split end portions to define a plurality of deformable tongues 586 (FIG. 4). The tongues 586 are adapted to be inserted into apertures 588 formed in the other end of the sections 60, 61 when these sections are assembled together so as to provide a snap-in construction whereby all four corners of the sections 60, 61 may be held tightly together. As shown in FIG. 4, each of the apertures 588 is provided with an enlarged bore 590 which defines a locking flange 592 which is adapted to receive the tongues 586 so that the two half sections of the cartridge are held tightly together.

It will be noted that the axis of symmetry of the sections 60, 61, i.e., a line through the center of the apertures 62, 63 is not at the exact middle of the sections 60 and 61. Accordingly, when these sections are assembled, the wide end flanges 564 extend over the narrow end flanges 562 of the opposite section so as to provide the above-described locking flanges 65, 66 (FIG. 1) which cooperate with the grooves 67, 68 provided in the side walls 70, 71 of the magazine 40.

In order to provide a resilient support for the magnetic tape within the cartridge against which the transducer head 126 may be pressed, and to provide a further extension of the circular surfaces 576 within the cartridge, there is provided on each of the sections 60, 61 a generally triangularly shaped boss 594 which provides a pair of arcuate surfaces 596 and 598 which are continuations of the surfaces 576, 578 and also provides an end surface 600 which when the sections 60, 61 are assembled together acts as a shoulder to receive a small piece of felt 602 (FIG. 3). Each of the sections 60, 61 is also provided with a guide post 604 adjacent one corner of the boss 594 and an aperture 606 adjacent the other corner of this boss. When the sections 60, 61 are assembled together each of the posts 604 of these sections is adapted to enter the hole 606 of the opposing section so that the completed cartridge is provided with two guide posts 604 over which the tape is transported as it is wound from one reel to the other. With this construction the guide posts 604 do not have any break or seam intermediate the length thereof, as they would have if half sections of each post were provided on each of the sections 60, 61, so that a smooth surface is provided over which the tape may be guided during transport past the transducer head.

In order to secure the central portions of the two half sections 60, 61 together so as to insure that a tight joint is provided adjacent the edge aperture 62 thereof, the boss 594 in each half section is provided with a split tongue post 608 and an aperture 610, the post 608 of one of these sections being adapted to enter the aperture 610 of the other section when the sections are assembled together so that the bosses 594 are held tightly together and the carriages securely closed adjacent the aperture 62.

In order to permit the use of flangeless reels 44, 45 on which the magnetic tape may be wound, each of the wall portions 560 of the sections 60, 61 is provided with a pair of raised annular boss portions 612 and 614 adjacent the hub receiving apertures 50, 51 therein. Furthermore, there is provided raised boss portions 616 and 618 in the area of the pins 604 and openings 606. The diameter of the boss portions 612, 614 is somewhat less than the diameter of the flangeless reels 44, 45 so the tape which is wound on the periphery of these reels need not scrape against the top and bottom walls 560 of the sections 60, 61. The guide bosses 616, 618 function to center the tape laterally within the cartridge so that it passes by the transducer head at a fixed location. Accordingly, the tape which is registered by the guide bosses 616, 618 is wound on the rim of the reels 44, 45 without scraping against the intervening portions of the walls 560 so that frictional drag on the edges of the tape is minimized. The felt backing strip 602 over which the tape is moved during the reeling operation, is preferably secured to the end walls of the triangularly shaped boss 594 by means of a suitable pressure-sensitive adhesive provided on one side of the felt. It will also be noted that the felt strip 602 is seated between the opposed pins 604 when the sections 60, 61 are assembled.

In order to secure each of the cartridges 42 in the magazine 40 so that this magazine may be handled without the cartridge dropping out of it, there is provided an elongated slot 620 in the wall portion 560 adjacent one of the corner pins 584 so that a thin flexible wall section 622 is provided. The wall section 622 is formed with a raised portion 624 which acts as a resiliently biased detent to hold the cartridge 42 in place within the magazine 40. More particularly, when the sections 60, 61 are assembled together it will be seen that the detent portions 624 are provided on opposite sides of the cartridge near the edge thereof through which the tape is accessible through the opening 63. The detents 624 are arranged to be compressed inwardly as the cartridge 42 is inserted into the magazine until a vertically extending groove 626 (FIG. 3) provided in each of the walls 70, 71 of the magazine near the rear wall thereof is encountered. The detents 624 then snap into the groove 626 so as to hold the cartridge 42 in place against the rear wall 76 of the magazine 40. The cartridges 42 are thus retained within the magazine 40 in proper registration while permitting the magazine 40 to be turned or twisted at any angle during handling without the cartridges dropping out. Furthermore, the detents 624 function to hold the cartridges 42 in place within the magazine 40 during playing periods when the transducer head 126 is pressed into engagement with the magnetic tape contained within the cartridge. Thus, the detents 624 provide sufficient retaining force to hold the cartridges in place against the force of the biasing spring 422 which urges the transducer head 126 against the tape. It will also be noted that the overhanging flanges 65, 66 of the assembled cartridge which are provided by the wide end flanges 564, overhang the detent portion 624 of the opposed half section so that these detent portions are protected from damage during periods when the cartridges are not positioned within the magazine.

It is also pointed out that with the above-described construction of the cartridges 42 and the magazine 40, the cartridges may readily be positioned within the magazine 40 while providing a minimum space for each cartridge. Thus, by providing the grooves 67, 68 which are offset vertically and the cooperating flanges 65, 66 on the cartridges, the cartridges are supported with a minimum of clearance between each cartridge within the magazine 40 so that an extremely compact magazine arrangement is provided wherein a large number of cartridges can be readily accommodated so as to provide the above-described automatic tape changing facilities in which the individual cartridges can be rapidly played in succession in a fully automatic manner. Furthermore, it is difficult to insert any of the cartridges 42 into the magazine 40 without the opening 62 thereof facing to the rear so as to be accessible to the transducer head 126 through the opening 78 in the rear of the magazine 40. This will be readily understood when it is realized that when a cartridge 42 is inserted with the opening 63 thereof facing the front of the machine, the flanges 65, 66 do not register with the corresponding grooves 67, 68 in the magazine 40. The inadvertent insertion of cartridges incorrectly into the magazine 40 is thereby prevented.

Considering now the construction of the reels 44, 45 and the manner in which the ends of the magnetic tape are secured thereto, each of these reels is provided with a plurality of reinforcing rib portions 630 which extend radially outwardly from the hub portion 53 and connect the same to a thin rim portion 632 on the outer periphery of which the tape is wound. A central web portion 634 is employed to provide a rigid reel structure.

In order to secure one end of a length of magnetic tape to each reel, a relatively wide, radially extending flange portion 640 is provided between the hub 53 and the rim 632 and a narrow slot 642 is provided which extends inwardly from the periphery of the reel and communicates with an enlarged opening 644 to the flange portion 640. The flange portion 640 is also provided with an irregularly-shaped opening 646 therethrough adjacent the slot 642 which defines a thin flexible clamping portion 648 adjacent one wall of the slot 642. A cylindrical drive pin 650 is provided which is originally formed in offset relation to the flange 640 and is connected thereto by means of a thin frangible neck portion 652 (FIG. 7). The end portion 654 of a length of magnetic tape is inserted into the slot 642 so that the extremity thereof extends into the opening 644. The pin 650 is then driven into the opening 646 in the flange portion 640 by striking the upper end 656 of the pin 650 a sharp blow which is sufficient to break the neck portion 652 and permit the pin 650 to be driven into the opening 646. However, when the cylindrical pin 650 is forced into the irregularly-shaped opening 646, it forces the flexible clamp portion 648 against the opposite wall of the slot 642 so that the end of the tape 654 is securely clamped between the clamping strip 648 and the adjacent portion 658 of the reel. Furthermore, the end of the tape is gripped clear across the width of the tape with this construction so that the tape is not skewed as it comes out of the slot 642. In this connection it will be understood that the tubular drive pin 650 is sufficiently flexible to deform to the shape shown in FIG. 8 when it is driven into the opening 646.

In accordance with a further feature of the invention, the portion 648 of the reel adjacent the slot 642 is arranged to be deformed slightly outwardly when the drive pin 650 is inserted into the aperture 646 by an amount approximately equal to the thickness of the tape 654. Accordingly, the second layer of tape 660 (FIG. 8) lays onto the underlayer 662 thereof without forming a pronounced bump which would produce an objectionable sound during reproduction. If the portion 658 were rigid then the first layer of tape 662 would produce an abrupt discontinuity and when the second layer 660 is wound thereon a slight bump in the periphery of the reel would be produced which would build up as the tape is wound on the reel and produce an objectionable discontinuity in reproduction.

The reels 44 and 45 are arranged within the cartridge 42 so that the inclined slots 642 thereof are directed toward each other and when either end of the tape is reached the tape is not bent back over the sharp edge of the corner 658. In assembly, one end of a length of magnetic tape is secured to one of the reels in the manner described heretofore and the desired length of tape is wound on this reel. The other end of the tape is then secured to another reel with the slot 642 reversely oriented, as shown in FIG. 3, and both reels are then assembled onto one of the half sections 60 of the cartridge after which the other half section 61 is assembled to the section 60 so that the tape is enclosed within the sections 60, 61 with the intermediate portion thereof extending over the guide posts 604 and across the felt backing strip 602. The pins 584 and 608 are snapped into place in the corresponding apertures in the opposite section with the posts 604 located in their corresponding apertures 606 to provide the completed cartridge.

In this connection it will be noted that both the reels 44, 45 are of identical construction and both of the half sections 60, 61 of the cartridge proper are of identical construction and may be readily formed by a suitable molding operation on a mass production basis. Preferably, the reels 44, 45 are molded of medium high impact polystyrene. This material is particularly suitable for a broaching operation on the peripheral and internal surfaces thereof, and also permits shearing of the locking pin on impact, as discussed heretofore, without shattering the entire reel. Also, the sections 60, 61 are preferably molded of a suitable copolymer of styrene and acrylonitrile, such as Tyril No. 780, which has sufficient rigidity for the overall cartridge housing while at the same time provding sufficient flexibility to insure correct operation of the detents 624.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A magnetic tape cartridge, comprising a housing consisting of two identical half sections, each half section having a pair of openings in one wall thereof, interlocking means formed integrally on each of said half sections for securing said half sections together with said openings therein in alignment, a pair of reels loosely retained in said aligned openings, a length of magnetic tape coiled on said reels, each end of said tape being connected to one of said reels, said housing having an opening to the exterior through which said tape is accessible as it passes from one reel to the other, and each of said reels being adapted to be rotated by means external to said cartridges.

2. A magnetic tape cartridge, comprising a housing having top and bottom walls provided with aligned apertures therein, a length of magnetic tape coiled on said reels, each end of said tape being secured to one of said reels, means defining annular reinforcing bosses on the inner faces of said top and bottom walls adjacent said apertures, a pair of reels loosely retained in said apertures and having rim portions riding on said top and bottom walls adjacent said bosses to minimize frictional drag as said tape is moved between said reels, said housing having an opening to the exterior through which said tape is accessible as it passes from one reel to the other, and each of said reels being adapted to be rotated by means external to said cartridges.

3. A magnetic tape cartridge, comprising a housing consisting of a pair of identical half sections each having a pair of openings in one wall thereof, interlocking means on each of said half sections for securing said half sections together with said openings therein in alignment, a pair of reels loosely retained in said aligned openings, a length of magnetic tape coiled on said reels, each end of said tape being permanently connected to one of said reels, said housing having an opening to the exterior through which said tape is accessible as it passes from one reel to the other, each of said reels being adapted to be rotated by means external to said cartridges, each of said half sections having an offset edge portion which overhangs the adjacent edge of the other half section when said half sections are assembled together, thereby to define positioning shoulders on opposite ends of said housing.

4. A magnetic tape cartridge comprising a housing having top and bottom walls provided with aligned apertures therein, a pair of reels loosely retained in said apertures, a length of magnetic tape coiled on said reels, each end of said tape being secured to one of said reels, said housing having an opening to the exterior through which said tape is accessible as it passes from one reel to the other, each of said reels being adapted to be rotated by means external to said cartridges, and means defining oppositely oriented positioning shoulders extending along the length of opposite ends of said housing.

5. A magnetic tape cartridge, comprising a housing consisting of a pair of identical half sections each having a pair of openings in one wall thereof, interlocking means on each of said half sections for securing said half sections together with said openings therein in alignment, a pair of reels loosely retained in said aligned openings, a length of magnetic tape coiled on said reels, each end of said tape being permanently connected to one of said reels, each of said half sections having a notch extending inwardly from one edge thereof, a guide post adjacent one corner of said notch and a guide post receiving opening adjacent the other corner of said notch, said notches defining an opening to the exterior when said half sections are assembled and said guide posts directing said tape through said opening as it passes from one reel to another, each of said reels being adapted to be rotated by means external to said cartridges, each of said half sections having an offset edge portion which overhangs the adjacent edge of the other half section when said half sections are assembled together, thereby to define positioning shoulders on opposite ends of said housing.

6. A magnetic tape cartridge, comprising a housing consisting of a pair of identical half sections each having a pair of openings in one wall thereof, interlocking means on each of said half sections for securing said half sections together with said openings therein in alignment, a pair of reels loosely retained in said aligned openings, a length of magnetic tape coiled on said reels, each end of said tape being permanently connected to one of said reels, said housing having an opening to the exterior through which said tape is accessible as it passes from one reel to the other, each of said reels being adapted to be rotated by means external to said cartridges, each of said half sections having an offset edge portion which overhangs the adjacent edge of the other half section when said half sections are assembled together, thereby to define positioning shoulders on opposite ends of said housing, and means defining a resilient positioning lug in said adjacent edge of each half section which is protected by said overhanging offset edge portion when said half sections are assembled.

7. A magnetic tape cartridge comprising a housing having top and bottom walls provided with aligned apertures therein, a pair of reels loosely retained in said apertures, a length of magnetic tape coiled on said reels, each end of said tape being secured to one of said reels, said housing having an opening to the exterior through which said tape is accessible as it passes from one reel to the other, each of said reels being adapted to be rotated by means external to said cartridges, means defining oppositely oriented positioning shoulders extending along the length of opposite ends of said housing, and means defining a resilient positioning lug in said ends of said housing and protected by said positioning shoulders.

8. A magnetic tape cartridge, comprising identical top and bottom portions each including a flat wall and a rim portion, each of said top and bottom portions having a pair of apertures therein, means for securing said rim portions together to provide an enclosure, a pair of reels positioned in said enclosure and loosely retained in said apertures, a length of magnetic tape coiled on said reels, each end of said tape being connected to one of said reels, said top and bottom portions having means defining an opening through which said tape is accessible as it passes from one reel to the other, each of said reels being adapted to be rotated by means external to said cartridge, each of said top and bottom portions having a slot in the flat wall portion thereof adjacent one end rim portion thereof so that said adjacent rim portion is deformable inwardly, said adjacent rim portion having an outwardly projecting lug portion, thereby to provide inwardly deformable positioning lugs on opposite ends of said cartridge.

9. A magnetic tape cartridge, comprising identical top and bottom portions each including a flat wall and a rim portion, each of said top and bottom portions having a pair of apertures therein, means for securing said rim portions together to provide an enclosure, a pair of reels positioned in said enclosure and loosely retained in said apertures, a length of magnetic tape coiled on said reels, each end of said tape being connected to one of said reels, said top and bottom portions having means defining an opening through which said tape is accessible as it passes from one reel to the other, each of said reels being adapted to be rotated by means external to said cartridge, each of said top and bottom portions having an offset edge portion which overhangs the rim of the opposite portion, each of said top and bottom portions also having a slot in the flat wall portion thereof adjacent one end rim portion thereof so that said adjacent rim portion is deformable inwardly, said adjacent rim portion having an outwardly projecting lug portion, thereby to provide inwardly deformable positioning lugs on opposite ends of said cartridge which are protected by said offset edge portions.

10. In a magnetic tape cartridge assembly, a reel having a hub portion adapted to be mounted in the cartridge, means defining a slot extending inwardly from the periphery of said reel, means defining an opening in said reel adjacent said slot to provide a thin deformable wall portion between said slot and said opening, and a plug member positioned in said opening, said plug member being sufficiently large to deform said thin wall portion and clamp the end of a piece of magnetic tape between said thin wall portion and the opposite wall of said slot.

11. In a magnetic tape cartridge assembly, a reel having a hub portion adapted to be mounted in the cartridge, means defining a slot extending inwardly from the periphery of said reel, means defining an opening in said reel adjacent said slot to provide a thin deformable wall portion between said slot and said opening, and a plug member positioned in said opening, said plug member being sufficiently large to deform said thin wall portion and clamp the end of a piece of magnetic tape between said thin wall portion and the opposite wall of said slot, said plug also exerting sufficient force on said wall of said slot to deform the adjacent peripheral portion of said reel slightly outwardly to minimize formation of a bump in the magnetic tape coiled about the periphery of said reel.

12. In a magnetic tape cartridge assembly, a reel having a hub portion adapted to be mounted in the cartridge, means defining a slot extending inwardly from the periphery of said reel at an acute angle relative to the periphery of said reel adjacent the peripheral end of said slot, means defining an opening in said reel adjacent said slot to provide a thin deformable wall portion between said slot and said opening, and a tubular pin member positioned in said opening, said tubular pin member being sufficiently large to deform said thin wall portion and clamp the end of a piece of magnetic tape between said thin wall portion and the opposite wall of said slot.

13. In a magnetic tape cartridge assembly, a reel having a hub portion adapted to be mounted in the cartridge, means defining a slot extending inwardly from the periphery of said reel, means defining an opening in said reel adjacent said slot to provide a thin deformable wall portion between said slot and said opening, and a tubular pin member positioned in said opening, said tubular pin member being sufficiently large to deform said thin wall portion and clamp the end of a piece of magnetic tape between said thin wall portion and a wall of said slot, said tubular pin also exerting sufficient force on said wall of said slot to deform the adjacent peripheral portion of said reel slightly to minimize formation of a bump in the magnetic tape coiled about the periphery of said reel.

14. In a magnetic tape cartridge assembly, a reel having a hub portion adapted to be mounted in the cartridge, means defining a slot extending inwardly from the periphery of said reel, means defining an opening in said reel adjacent said slot to provide a thin deformable wall portion between said slot and said opening, and a cylindrical plug member positioned with the end thereof connected to said reel through a shearable web portion, said plug being axially aligned with said opening but offset therefrom, said web portion being adapted to shear when a force is exerted on the end of said plug member remote from said opening so that said plug is driven into said opening and deforms said thin wall portion by an amount sufficient to clamp the end of a piece of magnetic tape between said thin wall portion and the opposite wall of said slot.

15. In a magnetic tape cartridge assembly, a reel having a hub portion adapted to be mounted in the cartridge, means defining a slot extending inwardly from the periphery of said reel, means defining an opening in said reel adjacent said slot to provide a thin deformable wall portion between said slot and said opening, and a cylindrical plug member positioned with the end thereof connected to said reel through a shearable web portion, said plug being axially aligned with said opening but offset therefrom, said web portion being adapted to shear when a force is exerted on the end of said plug member remote from said opening so that said plug is driven into said opening and deforms said thin wall portion by an amount sufficient to clamp the end of a piece of magnetic tape between said thin wall portion and a wall of said slot, said plug also exerting sufficient force on said wall of said slot to deform the adjacent peripheral portion of said reel slightly to minimize formation of a bump in the magnetic tape coiled about the periphery of said reel.

16. A magnetic tape cartridge, comprising a housing consisting of two identical half sections, each half section having a pair of openings in one wall thereof, each of said half sections having a plurality of projecting tongue portions and a plurality of apertures adapted to receive the tongue portions of the other half section, said tongue portions and apertures interlocking to secure said half sections together with said openings therein in alignment, a pair of reels loosely retained in said aligned openings, a length of magnetic tape coiled on said reels, each end of said tape being connected to one of said reels, said housing having an opening to the exterior through which said tape is accessible as it passes from one reel to the other, and each of said reels being adapted to be rotated by means external to said cartridges.

17. A magnetic tape cartridge, comprising a housing having top and bottom walls provided with aligned apertures therein, a pair of reels loosely retained in said apertures, a length of magnetic tape coiled on said reels, each end of said tape being secured to one of said reels, and means defining annular raised bosses on the inner faces of said top and bottom walls adjacent said apertures for minimizing frictional drag as said tape is moved between said reels, said housing having an opening to the exterior through which said tape is accessible as it passes from one reel to the other.

18. A magnetic tape cartridge, comprising a housing consisting of a pair of identical half sections each having a pair of apertures in one wall thereon, means for securing said half sections together with said apertures in alignment, a pair of reels loosely retained in said apertures, a length of magnetic tape coiled on said reels, each end of said tape being secured to one of said reels, said housing having an opening to the exterior through which said tape is accessible as it passes from one reel to the other, each of said half sections having a guide post extending from said one wall thereof adjacent said opening and a recess adapted to receive the guide post of the other half section, said guide posts being positioned to guide said tape across said opening as it moves from one reel to the other.

19. A magnetic tape cartridge, comprising a housing consisting of a pair of identical half sections each having a pair of apertures in one wall thereof, means for securing said half sections together with said apertures in alignment, a pair of reels loosely retained in said apertures, a length of magnetic tape coiled on said reels, each end of said tape being secured to one of said reels, said housing having an opening to the exterior through which said tape is accessible as it passes from one reel to the other, each of said half sections having a guide post extending from said one wall thereof adjacent said opening and a recess adapted to receive the guide post of the other half section, said guide posts being positioned to guide said tape across said opening as it moves from one reel to the other, and means defining raised bosses on said one wall of said half sections adjacent said guide posts for minimizing frictional drag on said tape as it is moved between said reels.

20. A magnetic tape cartridge, comprising a housing consisting of two identical half sections, each half section having a pair of openings in one wall thereof, each of said half sections having a plurality of projecting tongue portions and a plurality of apertures adapted to receive the tongue portions of the other half section, said tongue portions and apertures interlocking to secure said half sections together with said openings therein in alignment, a pair of reels loosely retained in said aligned openings, a length of magnetic tape coiled on said reels, each end of said tape being connected to one of said reels, said housing having an opening to the exterior through which said tape is accessible as it passes from one reel to the other, a raised boss portion on each of said half sections adjacent said opening, and interlocking means on said boss portions of said half sections for securing said half sections together adjacent said opening.

21. A magnetic tape cartridge, comprising a housing consisting of two identical half sections, each half section having a pair of openings in one wall thereof, each of said half sections having a plurality of projecting tongue portions and a plurality of apertures adapted to receive the tongue portions of the other half section, said tongue portions and apertures interlocking to secure said half sections together with said openings therein in alignment, a pair of reels loosely retained in said aligned openings, a length of magnetic tape coiled on said reels, each end of said tape being connected to one of said reels, said housing having an opening to the exterior through which said tape is accessible as it passes from one reel to the other, a raised boss portion on each of said half sections adjacent said opening, interlocking means on said boss portions of said half sections for securing said half sections together adjacent said opening, said raised boss portions together defining a shoulder, and a pressure pad positioned in engagement with said shoulder, said tape passing over said pressure pad as it moves from one reel to the other.

References Cited

UNITED STATES PATENTS

| | | | |
|---|---|---|---|
| 2,804,508 | 8/1957 | Mastling et al. | 179—100.2 |
| 2,891,737 | 6/1959 | Hasbrouck | 242—74.2 |
| 2,894,700 | 7/1959 | Roberts et al. | 242—55.13 |
| 2,926,861 | 3/1960 | Murdock | 242—55.13 |
| 3,023,943 | 3/1962 | Schober | 226—181 |

LEONARD D. CHRISTIAN, *Primary Examiner.*